United States Patent [19]
Yoshitake et al.

[11] Patent Number: 5,056,011
[45] Date of Patent: Oct. 8, 1991

[54] DIRECT MEMORY ACCESS CONTROLLER WITH EXPEDITED ERROR CONTROL

[75] Inventors: Akihiro Yoshitake, Kawasaki; Hideyuki Iino; Hidenori Hida, both of Yokohama, all of Japan

[73] Assignees: Fujitsu Limited; Fujitsu Microcomputer Systems Limited, both of Kawasaki, Japan

[21] Appl. No.: 320,446

[22] Filed: Mar. 8, 1989

[30] Foreign Application Priority Data

Mar. 9, 1988 [JP] Japan .................. 63-55899

[51] Int. Cl.⁵ .................. G06F 13/14; G06F 11/00; G06F 13/00
[52] U.S. Cl. .................. 364/200; 364/239.4; 364/240.5; 364/240.9; 364/241.2; 364/242.3; 364/242.31; 364/242.32; 364/242.33; 364/242.6; 364/264; 364/265.1
[58] Field of Search ... 364/200 MS File, 900 MS File

[56] References Cited
U.S. PATENT DOCUMENTS

| | | | |
|---|---|---|---|
| 3,999,163 | 12/1976 | Levy et al. | 364/200 |
| 4,293,908 | 10/1981 | Bradley et al. | |
| 4,507,732 | 3/1985 | Catiller et al. | 364/200 |
| 4,649,470 | 3/1987 | Bernstein et al. | 364/200 |
| 4,688,166 | 8/1987 | Schneider | 364/200 |
| 4,751,634 | 6/1988 | Burrus, Jr. et al. | 364/200 |
| 4,760,515 | 7/1988 | Malmquist et al. | 364/200 |
| 4,803,622 | 2/1989 | Bain, Jr. et al. | 364/200 |
| 4,827,409 | 5/1989 | Dickson | 364/200 |
| 4,831,523 | 5/1989 | Lewis et al. | 364/200 |
| 4,884,192 | 11/1989 | Terada et al. | 364/200 |

Primary Examiner—Stuart N. Hecker
Assistant Examiner—George C. Pappas
Attorney, Agent, or Firm—Armstrong, Nikaido, Marmelstein, Kubovcik & Murray

[57] ABSTRACT

A direct memory access (DMA) controller is adaptable to control a DMA which is independently made in a plurality of channels of a data processing apparatus, where the plurality of channels have predetermined priority sequences and the DMA controller includes a bus and terminal controller coupled to a system bus for obtaining a right to use the system bus responsive to a transfer request, an interrupt and slave controller coupled to the system bus for controlling an interrupt which is made to a central processing unit (CPU) when a data transfer ends for each of the plurality of channels and for controlling an access from the CPU, and an operation determination part for determining an operation of the DMA controller depending on the transfer request, whether or not the bus and terminal controller obtained the right to use the system bus and whether or not the access is made from the CPU. The slave and interrupt controller includes an interrupt controller for supplying to the CPU an interrupt of a channel in which an abnormal end of a data transfer has occurred with a priority over other channels in which a normal end of a data transfer has occurred regardless of the priority sequences of the plurality of channels.

17 Claims, 7 Drawing Sheets

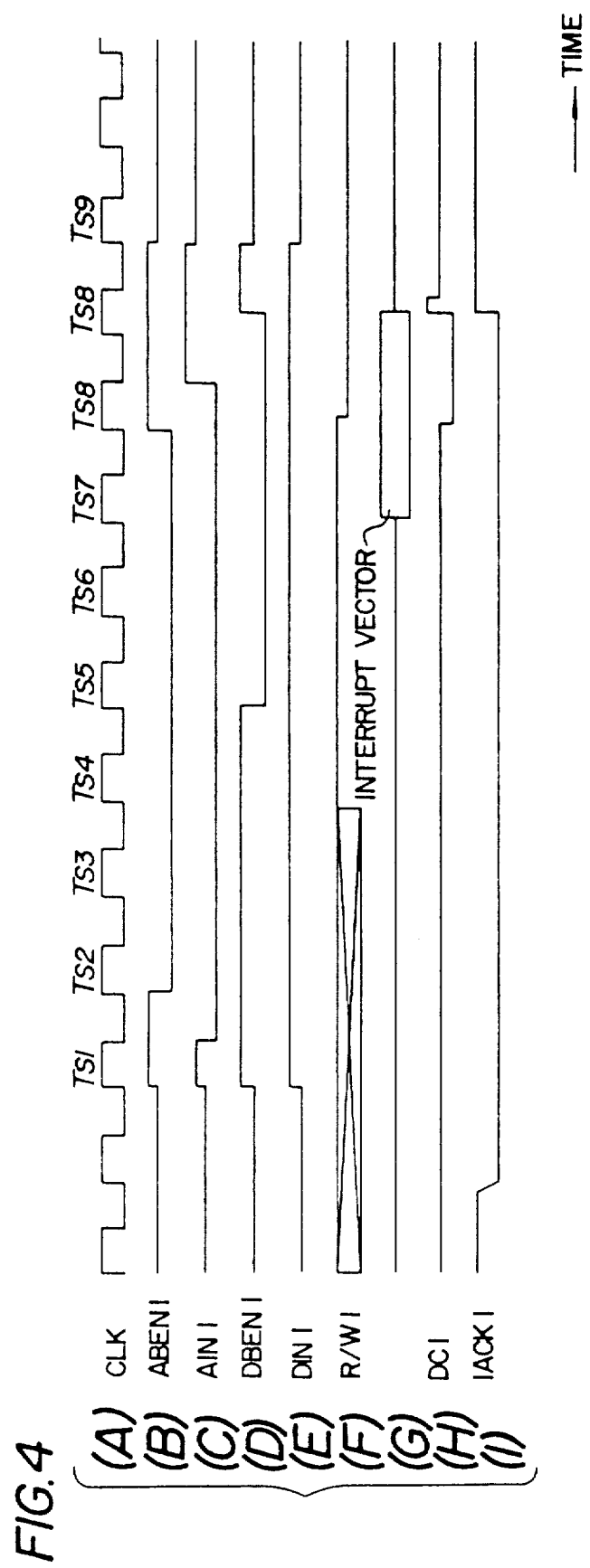

DIRECT MEMORY ACCESS CONTROLLER WITH EXPEDITED ERROR CONTROL

BACKGROUND OF THE INVENTION

The present invention generally relates to direct memory access controllers, and more particularly to a direct memory access controller which controls a direct data transfer.

In a data processing apparatus such as a computer system, a direct memory access controller (DMAC) is used to reduce data transfer time between a memory and an input/output (I/O) interface and between a memory and a memory which are coupled to a common system bus. According to the direct memory access (DMA), the data can be transferred directly between the memory and the I/O interface and between the memory and the memory under a control of the DMAC without passing the data through a central processing unit (CPU) which is used as a peripheral device coupled to the system bus.

There are DMACs which have a plurality of channels so as to independently make a data transfer in each channel. In this case, each channel generally informs the CPU of the end of the data transfer by an interrupt. The CPU executes an interrupt acknowledge cycle responsive to the interrupt and executes a process routine with respect to the end of the data transfer in accordance with an interrupt vector returned from the DMAC. Accordingly, when an interrupt request is made in a plurality of channels, there is a need to select one of the channels and supply the interrupt vector of the interrupt request to the CPU.

Conventionally, the DMAC is assigned priorities to the plurality of channels in advance. Hence, when the interrupt request is made in a plurality of channels, a channel having the highest priority of the channels is selected and the interrupt vector of the interrupt request is supplied to the CPU.

This means that when a data transfer is ended in a channel having a low priority due to an exception primary factor such as a bus error and a data transfer is normally ended in a channel having a high priority approximately at the same time, the conventional DMAC respects the channel having the high priority and supplies to the CPU an interrupt vector of the channel which has the high priority and in which the data transfer is normally ended. For this reason, there are problems in that there is a delay in providing the CPU with the primary factor related to the system failure such as a bus error so that a secondary failure may occur due to this delay.

SUMMARY OF THE INVENTION

Accordingly, it is a general object of the present invention to provide a novel and useful DMAC in which the problems described heretofore are eliminated.

Another and more specific object of the present invention is to provide a DMAC in which a CPU is provided with a primary factor related to a system failure regardless of the priority of a channel in which the primary factor exists. According to the DMAC of the present invention, it is possible to quickly provide the primary factor to the CPU thereby making it possible to prevent a secondary failure which may occur due to the system failure.

Still another object of the present invention is to provide a DMAC adaptable to control a direct memory access which is independently made in a plurality of channels of a data processing apparatus which includes at least a system bus, a central processing unit and a memory coupled to the system bus, where the plurality of channels have predetermined priority sequences and the DMAC comprises a bus and terminal controller device coupled to the system bus for obtaining a right to use the system bus responsive to a transfer request, an interrupt and slave controller device coupled to the system bus for controlling an interrupt which is made to the central processing unit when a data transfer ends for each of the plurality of channels and for controlling an access from the central processing unit, and operation determination device for determining an operation of the DMAC depending on the transfer request, whether or not the bus and terminal controller device obtained the right to use the system bus and whether or not the access is made from the central processing unit. The slave and interrupt controller device includes an interrupt controller for supplying to the central processing unit an interrupt of a channel in which an abnormal end of a data transfer has occurred with a priority over other channels, in which a normal end of a data transfer has occurred, regardless of the priority sequences of the plurality of channels. According to the DMAC of the present invention, it is possible to quickly provide a primary factor of a system failure to the central processing unit thereby making it possible to prevent a secondary failure which may be caused by a delay in providing the primary factor.

A further object of the present invention is to provide a direct memory access controller adapted to control a direct memory access which is independently made in a plurality of channels of a data processing apparatus which includes at least two system buses which are mutually independent, a central processing unit, an input/output interface and a memory coupled to each of the system buses, where the plurality of channels have predetermined priority sequences and the direct memory access controller comprises a bus and terminal controller device coupled to the system bus for obtaining a right to use the system bus responsive to a transfer request, an interrupt and slave controller device coupled to the system bus for controlling an interrupt which is made to the central processing unit when a data transfer ends for each of the plurality of channels and for controlling an access from the central processing unit, and an operation determination device for determining an operation of the direct memory access controller depending on the transfer request, whether or not the bus and terminal controller device obtained the right to use the system bus and whether or not the access is made from the central processing unit. The slave and interrupt controller device includes an interrupt controller for supplying to the central processing unit an interrupt of a channel in which an abnormal end of a data transfer has occurred with a priority over other channels, in which a normal end of a data transfer has occurred, regardless of the priority sequences of the plurality of channels.

Other objects and further features of the present invention will be apparent from the following detailed description when read in conjunction with the accompanying drawings.

BRIEF DESCRIPTION OF THE DRAWINGS

FIGS. 4(A) through 4(I) are time charts for explaining an interrupt acknowledge cycle of the DMAC shown in FIG. 2.

DETAILED DESCRIPTION

Figure 1:
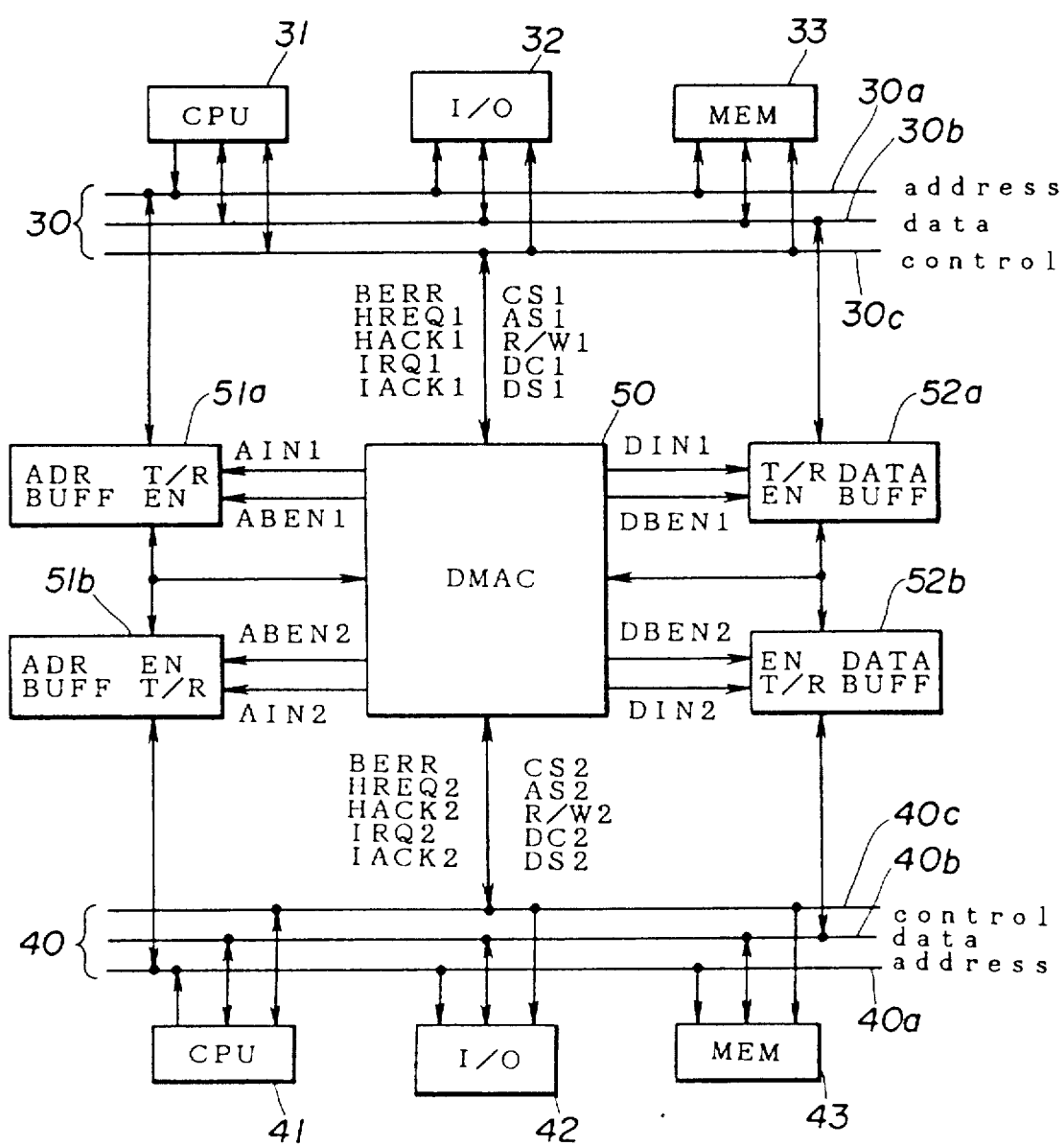
FIG. 1 is a system block diagram showing a data processing apparatus to which an embodiment of a DMAC according to the present invention may be applied.

FIG. 1 shows a data processing apparatus to which an embodiment of a direct memory access controller (DMAC) according to the present invention may be applied. In FIG. 1, a system bus 30 is made up of an address bus 30a, a data bus 30b and a control bus 30c. A central processing unit (CPU) 31, an input/output interface 32 and a memory 33 are coupled to the system bus 30. Similarly, a system bus 40 is made up of an address bus 40a, a data bus 40b and a control bus 40c, and a CPU 41, an input/output interface 42 and a memory 43 are coupled to the system bus 40. A DMAC 50 is coupled directly to the control buses 30c and 40c. The DMA controller 50 is also coupled to the address buses 30a and 40a through respective bidirectional address buffers 51a and 51b and to the data buses 30b and 40b through respective bidirectional data buffers 52a and 52b. Each of the buffers 51a, 51b, 52a and 52b have a terminal EN and a terminal T/R.

Control signals DBEN1 and DBEN2 which control ON/OFF states of the data buffers 52a and 52b are supplied to respective terminals EN from the DMAC 50. In addition, control signals DIN1 and DIN2 which control data transfer directions of the data buffers 52a and 52b are supplied to respective terminals T/R from the DMAC 50. Accordingly, it is possible to couple the data bus 30b and the data input/output terminal of the DMAC 50, the data bus 40b and the input/output terminal of the DMAC 50 or the data buses 30b and 40b.

The address buffers 51a and 51b have constructions identical to those of the data buffers 52a and 52b, and a description thereof will be omitted. The address buffer 51a receives a control signal ABEN1 which controls the ON/OFF state and a control signal AIN1 which controls the data transfer direction at respective terminals EN and T/R, while the address buffer 51b receives a control signal ABEN2 which controls the ON/OFF state and a control signal AIN2 which controls the data transfer direction at respective terminals EN and T/R.

Figure 2:
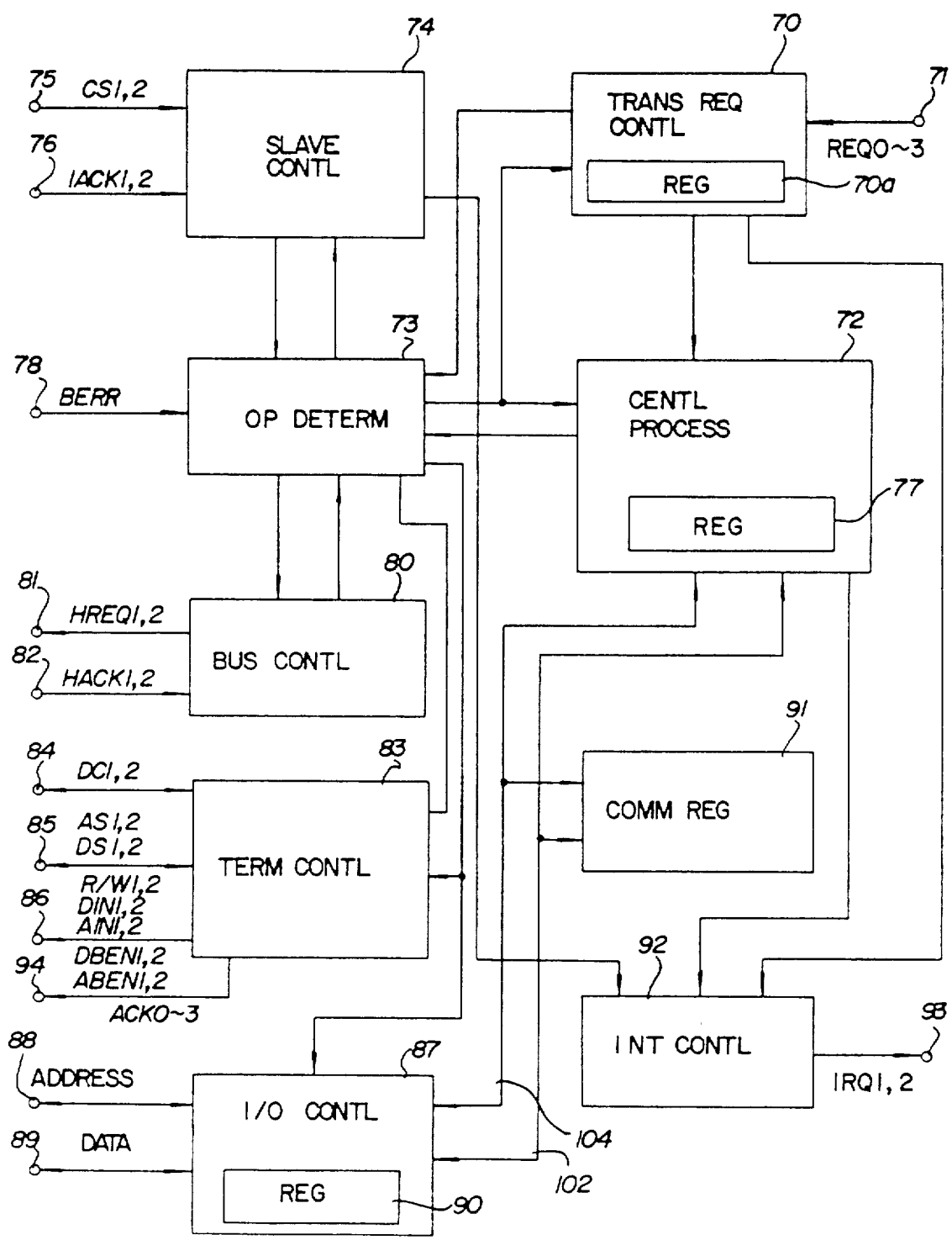
FIG. 2 is a system block diagram showing an embodiment of the DMAC according to the present invention.

FIG. 2 shows an embodiment of the DMAC 50. A transfer request controller 70 receives at a terminal 71 transfer requests REQ0 through REQ3 amounting to four channels which are obtained from the I/O interfaces 32 and 42 through the control buses 30c and 40c. Even when a plurality of transfer requests are received at the same time, the transfer request controller 70 selects one transfer request in conformance with a priority sequence which is determined in advance and is set in a priority register 70a. The transfer request controller 70 reports the selected transfer request to a central processor 72 and an operation determination part 73. The operation determination part 73 makes a response to the reported transfer request. The content of the priority register 70a is also supplied to an interrupt controller 92 which will be described later.

A slave controller 74 receives at terminals 75 and 76 chip select signals CS1 and CS2 and interrupt request acknowledge signals IACK1 and IACK2 which are obtained from the CPUs 31 and 41 through the control buses 30c and 40c. The chip select signals CS1 and CS2 are signals which are used by the CPUs 31 and 41 to make access to a register 77 or a communication register 91 which will be described later. The interrupt request acknowledge signals IACK1 and IACK2 are signals which are output from the CPUs 31 and 41 in acknowledgement when the DMAC 50 makes an interrupt request to the CPUs 31 and 41. Even when a plurality of such signals are received at the same time, the slave controller 74 selects one signal in conformance with a priority sequence of the system buses 30 and 40 which is determined in advance and reports the selected signal to the operation determination part 73. In addition, the slave controller 74 generates and supplies a vector request signal to the interrupt controller 92 when the interrupt acknowledge signal is received. In other words, the slave controller 74 controls the read/write cycle of the CPU and the interrupt acknowledge cycle, and such a control operation is referred to as a slave operation (or cycle). The slave operation is carried out only with respect to the system bus which can receive the signals CS and IACK due to the bus structure and the bus attribute.

The operation determination part 73 reports to the slave controller 74 whether or not a slave access can be made in response to the reported signal from the slave controller 74. In addition, the operation determination part 73 transmits the report from the slave controller 74 to the central processor 72. The operation determination part 73 supplies to the communication register 91 a bus attribute signal which indicates whether the slave access is from the system bus 30 or 40. The slave controller 74, which receives the report that the slave access is possible, generates a read request signal or a write request signal and supplies the generated signal to the central processor 72 and the communication register 91. In other words, the operation determination part 73 determines the operation by arbitrating the primary factors of the operation of the DMAC 50 such as the transfer request and the slave request.

The central processor 72 carries out an administration of the total operating state of the DMAC 50, and the operating state and the operating request are reported to the operation determination part 73. A source address, a destination address, a number of bytes of the data to be transferred (transfer bytes) and the like required for the transfer are stored in register 77 within the central processor 72. In other words, the central processor 72 carries out micro-control, control of the transfer information by PLA, and calculation of the address and the number of transfer bytes.

When a request is received from the transfer request controller 70, the operation determination part 73 outputs an instruction to a bus controller 80 so that the bus controller 80 supplies bus request signals HREQ1 and HREQ2 to the CPUs 31 and 41 through a terminal 81. Bus request acknowledge signals HACK1 and HACK2 which are respectively output from the CPUs 31 and 41 in response to the bus request signals HREQ1 and HREQ2 are received at a terminal 82 and supplied to the bus controller 80. The bus controller 80 reports the bus request acknowledge signals HACK1 and HACK2 to the operation determination part 73 and this report is transmitted to the central processor 72. Hence, the bus controller 80 controls the operation of obtaining the right to use the system bus from the CPU (bus master) for the purpose of making the DMA transfer.

When the operation determination part 73 is supplied with bus error signals BERR from the control buses 30c and 40c through a terminal 78, the operation determination part 73 makes a close request to the central processor 72 to close the channel in which the data transfer is taking place.

The central processor 72 ends the data transfer of a corresponding channel and generates an interrupt request signal which is supplied to the interrupt controller 92 in the case of a normal end when a byte count indicative of a remaining number of bytes of the transfer data in each channel becomes zero or in the case of an abnormal end when the close request is received due to the bus error signals BERR. At the same time, the central processor 72 supplies to an internal data bus 102 an interrupt status indicative of the end state of the data transfer.

A terminal controller 83 receives data complete signals DC1 and DC2 which are respectively received at a terminal 84 from the control buses 30c and 40c. The data complete signals DC1 and DC2 indicate the completion of the data write or read operation. The terminal controller 83 reports the data complete signals DC1 and DC2 to the operation determination part 73 and also outputs the data complete signals DC1 and DC2 through the terminal 84 in response to an instruction from the operation determination part 73. In addition, the terminal controller 83 receives read/write signals R/W1 and R/W2 which are respectively received at a terminal 85 from the control buses 30c and 40c. The terminal controller 83 reports the read/write signals R/W1 and R/W2 to the operation determination part 73. In addition, the terminal controller 83 outputs address strobe signals AS1 and AS2, the data strobe signals DS1 and DS2 and the read/write signals R/W1 and R/W2 through the terminal 85 in response to an instruction from the operation determination part 73. Furthermore, the terminal controller 83 supplies control signals AIN1, AIN2, ABEN1, ABEN2, DIN1, DIN2, DBEN1 and DBEN2 to the address buffers 51a and 51b and the data buffers 52a and 52b through a terminal 86 and outputs data transfer acknowledge signals ACK0 through ACK3 through a terminal 94 in response to an instruction from the operation determination part 73. Therefore, the terminal controller 83 controls the terminals which are coupled to the external operation control system and the external buffer control system, and restricts the output operation, input timing and the like of the terminals depending on the transfer, slave, bus structure and the like.

An input/output controller 87 supplies the address from the address buffers 51a and 51b received at a terminal 88 to the register 77 within the central processor 72 and to the communication register 91 in response to an instruction from the operation determination part 73. The input/output controller 87 also supplies the address from the central processor 72 to the address buffers 51a and 51b through the terminal 88. In addition, the input/output controller 87 supplies the data from the data buffers 52a and 52b received at a terminal 89 to the register 77 and the communication register 91 through the internal data bus 102, and supplies the data from the register 77 or the communication register 91 to the data buffers 52a and 52b through the terminal 89. Moreover, the transfer data at the time of a dual transfer is stored in a data holding register 90 within the input/output controller 87. In other words, the input/output controller 87 controls the input and output of the address and data, and the data holding register 90 is used for the data input and output of the transfer descriptor.

The communication register 91 stores the communication message between the CPUs 31 and 41. In other words, the communication between the CPUs 31 and 41 is made through the communication register 91.

The buffers 51a, 51b, 52a and 52b shown in FIG. 1 and the DMAC 50 shown in FIG. 2 are further disclosed in a U.S. patent application Ser. No. 315,842 filed Feb. 27, 1989 entitled "DIRECT MEMORY ACCESS CONTROLLER" claiming priorities from Japanese Patent Applications No. 63-042998, No. 63-055898 and No. 63-055900 the disclosure of which is hereby incorporated by reference.

Figure 3:
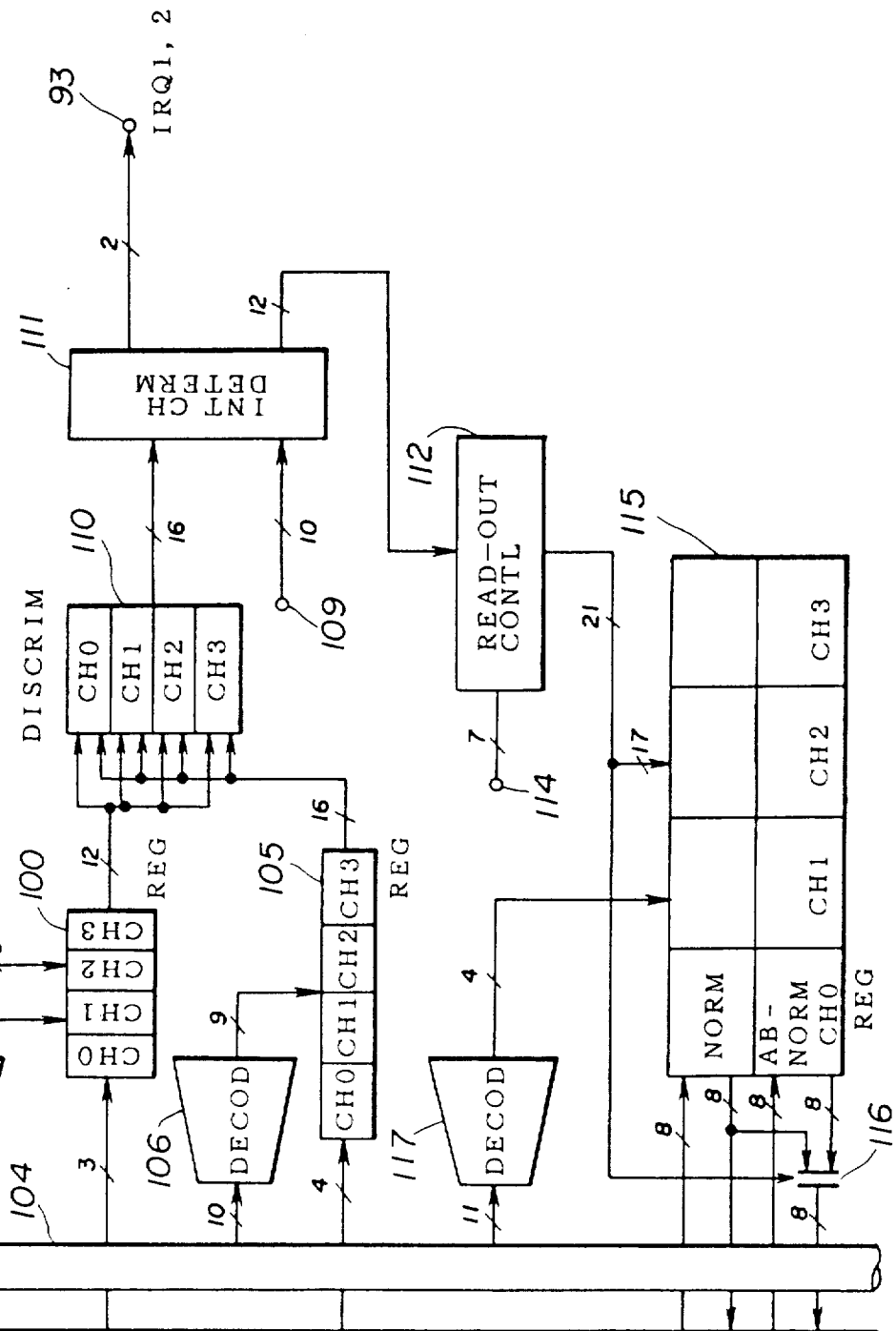
FIG. 3 is a system block diagram showing an embodiment of an interrupt controller of the DMAC shown in FIG. 2.

FIG. 3 shows an embodiment of the interrupt controller 92. In FIG. 3, an end status register 100 is divided into four sections in correspondence with four channels CH0 through CH3. When an end state write request signal from the central processor 72 shown in FIG. 2 is received for each channel through a terminal 101, the end status register 100 stores the end status which is received from the central processor 72 through the internal data bus 102 in a region of the channel designated by the end state write request signal.

In addition, when a predetermined address from the CPU 31 or 41 is supplied to a decoder 103 through an internal address bus 104 during the test, the end status register 100 is cleared by an output signal of the decoder 103 for each channel.

An interrupt mask register 105 is divided into four sections in correspondence with the four channels CH0 through CH3. When an instruction is received from a decoder 106 which decodes the address, the interrupt mask register 105 stores a value of an interrupt mask which is received from the CPU 31 or 41 for each channel.

The end status output from the end status register 100 and the interrupt mask output from the interrupt mask register 105 are supplied to an interrupt mask and interrupt discriminating circuit 110 for each channel so as to discriminate whether the interrupt is to be permitted or prohibited by comparing the end status and the interrupt mask for each channel. When the interrupt is permitted, the interrupt mask and interrupt discriminating circuit 110 discriminates from the end status whether the end is an abnormal end which is caused by a bus error and the like or a normal end which is an end of the data transfer, and a discrimination result is supplied to an interrupt channel determination circuit 111 for each channel.

The priorities of each of the channels CH0 through CH3 are supplied from the priority register 70a to the interrupt channel determination circuit 111 through a terminal 109. First, when there are channels in which the abnormal end has occurred, a channel having a highest priority out of these channels is selected. On the other hand, when there are no channels in which the abnormal end has occurred but there are channels in which the normal end has occurred, a channel having a highest priority out of these channels is selected. For example, when the priorities of the channels are set so that the channel CH0 has the highest priority and the priorities of the remaining channels CH1 through CH3 are lower than that of the channel CH0 in this sequence, an abnormal interrupt of the channel CH0 has the highest priority. Abnormal interrupts of the channels CH1 through CH3 have priorities which are next highest to that of the channel CH0 in this sequence, and normal interrupts of the channels CH0 through CH3 have priorities which are next highest to the priority of the abnormal interrupt of the channel CH3 in this sequence.

The interrupt channel determination circuit 111 generally comprises a programmable logic array (PLA) which produces the output signals responsive to the input signals shown in the following Table 1. In the Table 1, PR0, PR1 and PR2 denote the priority obtained from the terminal 109, ECH0 through ECH3 denote channels in which an error has occurred, NCH0 through NCH3 denote normal channels in which no error has occurred. In addition, NORM indicates the existence of an abnormality when "0", CH0 through CH3 denote the channels in which an interrupt is to be made, and IRQ denotes the interrupt request signal IRQ1 or IRQ2 output from the terminal 93. "X" denotes a "don't care". Further, the Table 2 shows the priorities of the channels CH0 through CH3 determined by the values of PR0 through PR2.

TABLE 1

| | INPUT | | | | | | | | | | OUTPUT | | | | |
|---|---|---|---|---|---|---|---|---|---|---|---|---|---|---|---|
| PR0 | PR1 | PR2 | ECH0 | ECH1 | ECH2 | ECH3 | NCH0 | NCH1 | NCH2 | NCH3 | NORM | CH0 | CH1 | CH2 | CH3 | IRQ |
| X | X | 0 | 1 | X | X | X | X | X | X | X | 0 | 1 | 0 | 0 | 0 | 1 |
| 0 | 0 | 1 | 1 | 0 | 0 | 0 | X | X | X | X | 0 | 1 | 0 | 0 | 0 | 1 |
| 1 | 0 | 1 | 1 | X | 0 | 0 | X | X | X | X | 0 | 1 | 0 | 0 | 0 | 1 |
| 0 | 1 | 1 | 1 | X | X | 0 | X | X | X | X | 0 | 1 | 0 | 0 | 0 | 1 |
| X | X | 0 | 0 | 0 | 0 | 0 | 1 | X | X | X | 1 | 1 | 0 | 0 | 0 | 1 |
| X | X | X | 0 | 0 | 0 | 0 | 1 | 0 | 0 | 0 | 1 | 1 | 0 | 0 | 0 | 1 |
| 1 | 0 | 1 | 0 | 0 | 0 | 0 | 1 | X | 0 | 0 | 1 | 1 | 0 | 0 | 0 | 1 |
| 0 | 1 | 1 | 0 | 0 | 0 | 0 | 1 | X | X | 0 | 1 | 1 | 0 | 0 | 0 | 1 |
| X | 0 | 0 | 0 | 1 | X | X | X | X | X | X | 0 | 0 | 1 | 0 | 0 | 1 |
| 0 | 1 | 0 | 0 | 1 | 0 | 0 | X | X | X | X | 0 | 0 | 1 | 0 | 0 | 1 |
| 1 | 1 | 0 | 0 | 1 | X | 0 | X | X | X | X | 0 | 0 | 1 | 0 | 0 | 1 |
| 0 | 0 | 1 | X | 1 | X | X | X | X | X | X | 0 | 0 | 1 | 0 | 0 | 1 |
| 1 | 0 | 1 | 0 | 1 | 0 | 0 | X | X | X | X | 0 | 0 | 1 | 0 | 0 | 1 |
| 0 | 1 | 1 | 0 | 1 | X | 0 | X | X | X | X | 0 | 0 | 1 | 0 | 0 | 1 |
| X | 0 | 0 | 0 | 0 | 0 | 0 | 0 | 1 | X | X | 1 | 0 | 1 | 0 | 0 | 1 |
| X | X | X | 0 | 0 | 0 | 0 | 1 | 0 | 0 | 0 | 1 | 0 | 1 | 0 | 0 | 1 |
| 1 | 1 | 0 | 0 | 0 | 0 | 0 | 0 | 1 | X | 0 | 1 | 0 | 1 | 0 | 0 | 1 |
| 0 | 0 | 1 | 0 | 0 | 0 | 0 | X | 1 | X | X | 1 | 0 | 1 | 0 | 0 | 1 |
| 0 | 1 | 1 | 0 | 0 | 0 | 0 | 0 | 1 | X | 0 | 1 | 0 | 1 | 0 | 0 | 1 |
| 0 | X | 0 | 0 | 0 | 1 | X | X | X | X | X | 0 | 0 | 0 | 1 | 0 | 1 |
| 1 | X | 0 | 0 | 0 | 1 | 0 | X | X | X | X | 0 | 0 | 0 | 1 | 0 | 1 |
| 0 | 1 | 0 | 0 | X | 1 | X | X | X | X | X | 0 | 0 | 0 | 1 | 0 | 1 |
| X | 0 | 1 | X | 0 | 1 | X | X | X | X | X | 0 | 0 | 0 | 1 | 0 | 1 |
| 1 | 0 | 1 | X | X | 1 | X | X | X | X | X | 0 | 0 | 0 | 1 | 0 | 1 |
| 0 | 1 | 1 | 0 | 0 | 1 | 0 | X | X | X | X | 0 | 0 | 0 | 1 | 0 | 1 |
| 0 | X | 0 | 0 | 0 | 0 | 0 | 0 | 0 | 1 | X | 1 | 0 | 0 | 1 | 0 | 1 |
| X | X | X | 0 | 0 | 0 | 0 | 0 | 0 | 1 | 0 | 1 | 0 | 0 | 1 | 0 | 1 |
| 0 | 1 | 0 | 0 | 0 | 0 | 0 | X | 1 | 1 | X | 1 | 0 | 0 | 1 | 0 | 1 |
| X | 0 | 1 | 0 | 0 | 0 | 0 | X | 0 | 1 | X | 1 | 0 | 0 | 1 | 0 | 1 |

| PR0 | PR1 | PR2 | ECH0 | ECH1 | ECH2 | ECH3 | NCH0 | NCH1 | NCH2 | NCH3 | NORM | CH0 | CH1 | CH2 | CH3 | IRQ |
| 1 | 0 | 1 | 0 | 0 | 0 | 0 | X | X | 1 | 1 | 1 | 0 | 0 | 1 | 0 | 1 |
| 0 | 0 | 0 | 0 | 0 | 0 | X | X | X | 1 | X | 0 | 0 | 0 | 0 | 1 | 1 |
| 1 | X | 0 | 0 | 0 | X | 1 | X | X | X | X | 0 | 0 | 0 | 0 | 1 | 1 |
| X | 1 | 0 | 0 | X | 0 | 1 | X | X | X | X | 0 | 0 | 0 | 0 | 1 | 1 |
| 1 | 1 | 0 | 0 | X | X | 1 | X | X | X | X | 0 | 0 | 0 | 0 | 1 | 1 |
| 0 | X | 1 | X | 0 | 0 | 1 | X | X | X | X | 0 | 0 | 0 | 0 | 1 | 1 |
| 1 | 0 | 1 | X | X | 0 | 1 | X | X | X | X | 0 | 0 | 0 | 0 | 1 | 1 |
| 0 | 1 | 1 | X | X | X | 1 | X | X | X | X | 0 | 0 | 0 | 0 | 1 | 1 |
| X | X | X | 0 | 0 | 0 | 0 | 0 | 0 | 0 | 1 | 1 | 0 | 0 | 0 | 1 | 1 |
| 1 | X | 0 | 0 | 0 | 0 | 0 | 0 | X | 1 | 1 | 1 | 0 | 0 | 0 | 1 | 1 |
| X | 1 | 0 | 0 | 0 | 0 | 0 | X | 0 | X | 1 | 1 | 0 | 0 | 0 | 1 | 1 |
| 1 | 1 | 0 | 0 | 0 | 0 | 0 | X | X | 0 | 1 | 1 | 0 | 0 | 0 | 1 | 1 |
| 0 | X | 1 | 0 | 0 | 0 | 0 | X | 0 | 0 | 1 | 1 | 0 | 0 | 0 | 1 | 1 |
| 1 | 0 | 1 | 0 | 0 | 0 | 0 | X | X | 0 | 1 | 1 | 0 | 0 | 0 | 1 | 1 |
| 0 | 1 | 1 | 0 | 0 | 0 | 0 | X | X | X | 1 | 1 | 0 | 0 | 0 | 1 | 1 |
| X | X | X | 0 | 0 | 0 | 0 | 0 | 0 | 0 | 0 | 0 | 0 | 0 | 0 | 0 | 1 |

TABLE 2

| PR2 | PR1 | PR0 | PRIORITY |
|---|---|---|---|
| 0 | 0 | 0 | CH0 → CH1 → CH2 → CH3 |
| 0 | 0 | 1 | CH0 → CH1 → CH3 → CH2 |
| 0 | 1 | 0 | CH0 → CH2 → CH3 → CH1 |
| 0 | 1 | 1 | CH0 → CH3 → CH1 → CH2 |
| 1 | 0 | 0 | CH1 → CH2 → CH3 → CH0 |
| 1 | 0 | 1 | CH2 → CH3 → CH0 → CH1 |
| 1 | 1 | 0 | CH3 → CH0 → CH1 → CH2 |

The interrupt channel determination circuit 111 supplies to a read-out control circuit 112 a number of the selected channel and a signal designating either the normal end or the abnormal end. Further, the interrupt channel determination circuit 111 also outputs an interrupt request signal IRQ1 or IRQ2 through the terminal 93 and supplies this interrupt request signal to one of the CPUs 31 and 41 which controls the channel in which the interrupt is generated.

When the read-out control circuit 112 receives a vector request signal from the slave controller 74 through a terminal 114, the read-out control circuit 112 decodes the signal from the interrupt channel determination circuit 111 and generates a select signal of a vector register 115. This select signal generated from the read-out control circuit 112 is supplied to the vector register 115 and a data selector 116.

The vector register 115 stores interrupt vectors of the normal interrupt and the abnormal interrupt for each of the channels CH0 through CH3. These interrupt vectors are supplied to the vector register 115 from the CPU 31 or 41 through the internal data bus 102 and stored in the vector register 115 when a predetermined address from the CPU 31 or 41 is decoded in a decoder 117. When the internal data bus 102 has 16 bits, for example, each interrupt vector has 8 bits and the data selector 116 is provided to supply the interrupt vector to the lower 8 bits of the internal data bus 102, for example.

The interrupt vector of the normal interrupt or the abnormal interrupt is read out from the vector register 115 from the select signal output from read-out control circuit 112 and is supplied to the internal data bus 102. This interrupt vector is supplied to the CPU 31 or 41 through the input/output controller 87.

When the interrupt request signal IRQ1 is output through the terminal 93, the CPU 31 asserts the interrupt request acknowledge signal IACK1 as indicated by a low level in FIG. 4(I) and executes an interrupt acknowledge cycle.

The DMAC 50 is supplied with a clock signal CLK shown in FIG. 4(A). When the low-level interrupt request acknowledge signal IACK1 shown in FIG. 4(I) is received from the CPU 31 during the interrupt acknowledge cycle, the DMAC 50 sets the control signals ABEN1 and AIN1 shown in FIGS. 4(B) and 4(C) to low levels during a cycle Ts1.

In addition, the DMAC 50 sets the control signal DBEN1 shown in FIG. 4(D) to a low level and the control signal DIN1 shown in FIG. 4(E) to a high level during a cycle Ts4 independently of a high-level read-/write signal R/W1 shown in FIG. 4(F). Accordingly, the interrupt vector shown in FIG. 4(G), which is read out from the vector register 115, is output from the DMAC 50 and supplied to the CPU 31. Furthermore, the DMAC 50 outputs the data complete signal DC1 shown in FIG. 4(H).

By supplying to the CPUs 31 and 41 the interrupt vector of the abnormal interrupt with priority over the interrupt vector of the normal interrupt, the CPUs 31 and 41 are informed of the primary factor of the system failure with priority and at an early stage. As a result, the CPUs 31 and 41 can appropriately and quickly cope with the system failure and carry out a recovery process or the like. For this reason, it is possible to prevent a secondary failure which may be generated when the CPUs 31 and 41 are not promptly informed of the primary factor of the system failure.

Next, a description will be given of the advantageous features obtainable in the DMAC according to the present invention in comparison with the conventional DMAC. It is assumed hereunder for convenience sake that the priorities of the channels CH0 through CH3 is high to low in this sequence.

Figure 5A:
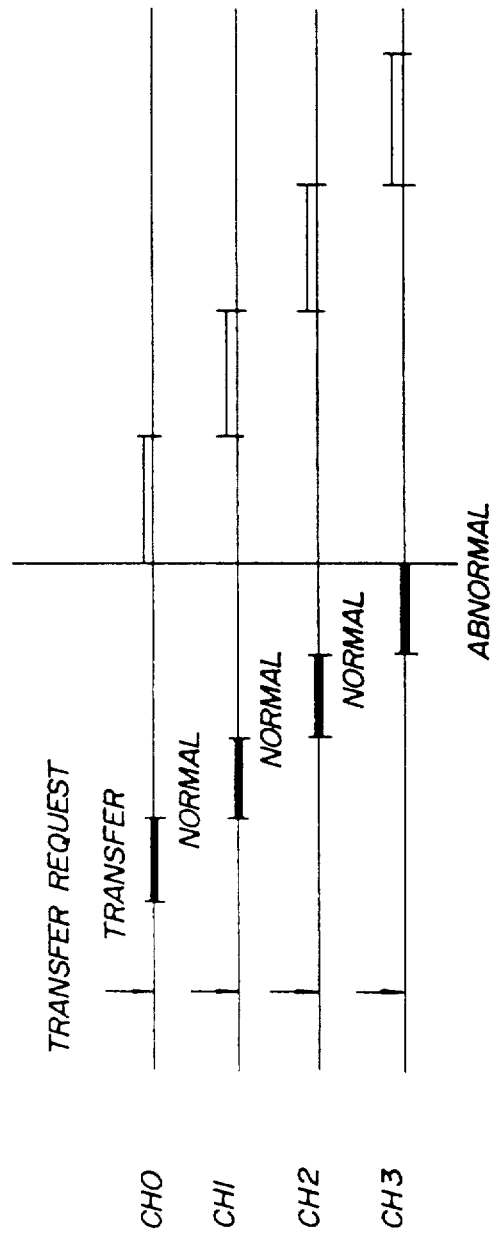
FIGS. 5A and 5B, 6A and 6B, and 7A and 7B are diagrams for explaining the importance of quickly detecting an abnormality in the DMAC according to the present invention in comparison with the conventional DMAC.

FIG. 5A shows a transfer cycle of the conventional DMAC, an interrupt acknowledge cycle, and an interrupt process of the CPU for each of the channels CM0 through CH3. During the transfer cycle, the transfer in the channels CH0 through CH2 are normal, but an abnormality of the transfer occurs in the channel CH3. In this case, the interrupt acknowledge cycle and the interrupt process are sequentially carried out for the channels CH0 through CH2, and the abnormality is thereafter detected during the interrupt acknowledge cycle and the interrupt process for the channel CH3. In a case where this conventional DMAC is provided in a data processing apparatus which discriminates the entire system as being abnormal even when one abnormality is detected, there is no cure for the abnormality detected in the channel CH3 such as carrying out a recovery process because the interrupt acknowledge cycle and the interrupt process of the CPU are already carried out for the channels CH0 through CH2 and information related thereto are no longer available.

Figure 5B:
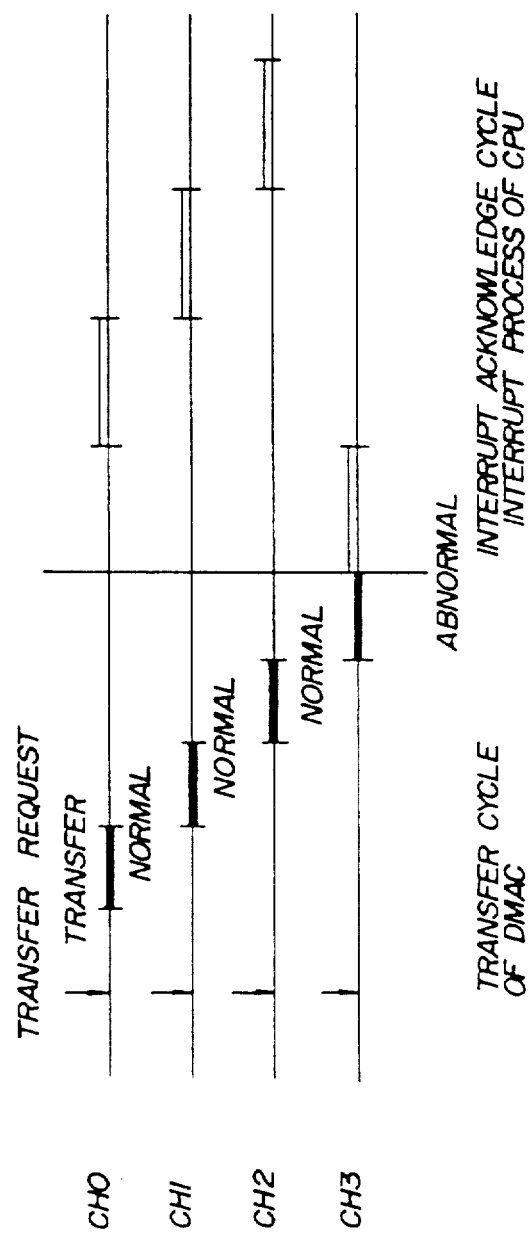

FIG. 5B shows a transfer cycle of the DMAC according to the present invention, an interrupt acknowledge cycle, and an interrupt process of the CPU for each of the channels CH0 through CH3. During the transfer cycle, the transfer in the channels CH0 through CH2 are normal, but an abnormality of the transfer occurs in the channel CH3 as described before in conjunction with FIG. 5A. In this case, the abnormality is first detected during the interrupt acknowledge cycle and the interrupt process for the channel CH3 regardless of the priorities of the normal channels CH0 through CH2, and the interrupt acknowledge cycle and the interrupt process are sequentially carried out thereafter for the channels CH0 through CH2. Therefore, even in a case where the DMAC according to the present invention is provided in the data processing apparatus which discriminates the entire system as being abnormal even when one abnormality is detected, there is cure for the abnormality detected in the channel CH3 such as carrying out a recovery process because the abnormality is detected first with priority over the normal channels CH0 through CH2. The interrupt acknowledge cycle and the interrupt process of the CPU can be carried out for the channels CH0 through CH2 after the recovery process or the like is carried out with respect to the abnormality, and the information related to the interrupt acknowledge cycle and the interrupt process of the CPU are available if necessary since the interrupt acknowledge cycle and the interrupt process of the CPU have not yet been carried out for the normal channels CH0 through CH2 at a stage when the abnormal channel CH3 is detected.

Figure 6A:
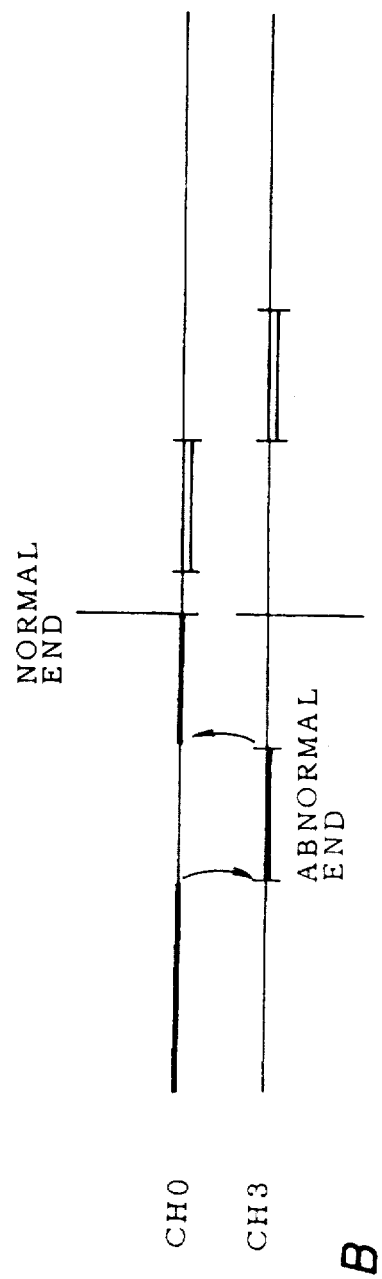

FIG. 6A shows a transfer cycle of the conventional DMAC, the interrupt acknowledge cycle, and the interrupt process of the CPU for the channels CH0 and CH3 when a transfer is alternately made in the two channels CH0 through CH3. A transfer in the channel CH0 switches over to the channel CH3 and the transfer in the channel CH3 is ended due to an abnormality (that is, an abnormal end occurs). A transfer starts again in the channel CH0 and this transfer ends normally (that is, a normal end occurs). In this case, the interrupt acknowledge cycle and the interrupt process of the CPU are first carried out with respect to the channel CH0 which has a higher priority than the channel CH3. Thereafter, the abnormality is detected in the channel CH3. For this reason, it is impossible to detect the abnormality in both the channels CH0 and CH3 in which the transfer actually took place, and the recovery with respect to the channel CH0 cannot be made because the information related to the interrupt acknowledge cycle and the interrupt process of the CPU for the channel CH0 are no longer available.

Figure 6B:
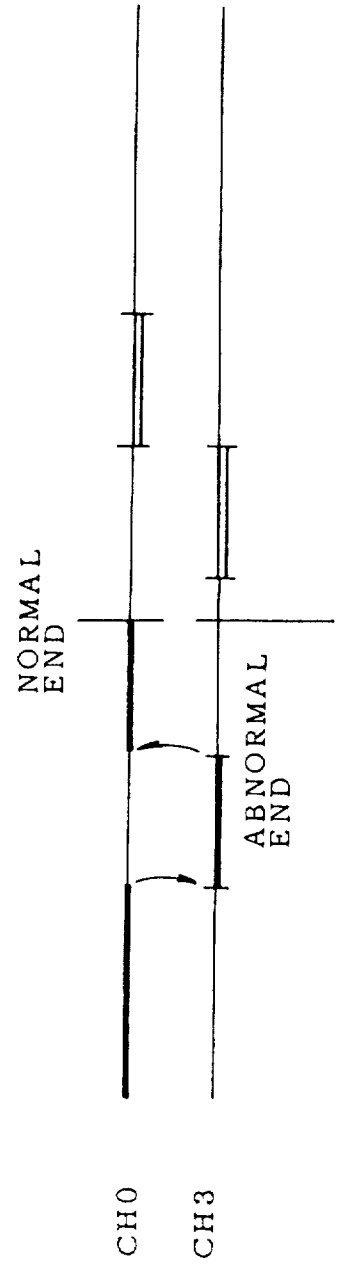

FIG. 6B shows a transfer cycle of the DMAC according to the present invention, the interrupt acknowledge cycle, and the interrupt process of the CPU for the channels CH0 and CH3 when a transfer is alternately made in the two channels CH0 through CH3. A transfer in the channel CH0 switches over to the channel CH3 and the transfer in the channel CH3 is ended due to an abnormality (that is, an abnormal end occurs). A transfer starts again in the channel CH0 and this transfer ends normally (that is, a normal end occurs), as described before in conjunction with FIG. 6A. In this case, the abnormality is first detected in the channel CH3 regardless of the fact that the channel CH0 has a higher priority than the channel CH3. Therefore, when the data processing apparatus is designed to write the necessary information and turn OFF the power when an abnormality occurs, the present invention can make the necessary recovery process as may be seen from FIG. 6B while such a recovery process cannot be made in the conventional case shown in FIG. 6A.

Figures 7A, 7B:
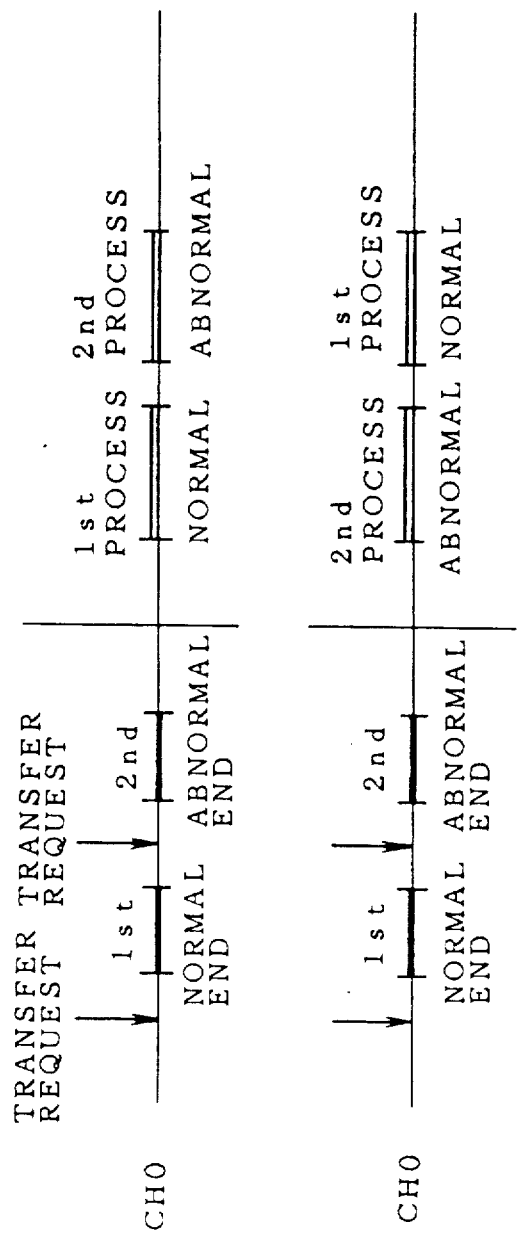

FIG. 7A shows a transfer cycle of the conventional DMAC employing the queue registration system, the interrupt acknowledge cycle, and the interrupt process of the CPU for the channel CH0 when two transfers are successively made in the channel CH0. A normal end occurs after the first transfer but an abnormal end occurs after the second transfer. The processing of information in this case is carried out in the sequence in which the transfers end. As a result, the abnormality in the second transfer is only detected during a second processing which occurs after a first processing with respect to the first transfer, and the detection of the abnormality is delayed.

FIG. 7B shows a transfer cycle of the DMAC according to the present invention, the interrupt acknowledge cycle, and the interrupt process of the CPU for the channel CH0 when two transfers are successively made in the channel CH0. A normal end occurs after the first transfer but an abnormal end occurs after the second transfer as in the case described before in conjunction with FIG. 7A. The processing of information in this case is not carried out in the sequence in which the transfers end, and the abnormality in the second transfer is first detected before the processing with respect to the first transfer. Hence, it is possible to carry out the necessary recovery process with respect to the channel CH0 while such a recovery process cannot be carried out in the conventional case shown in FIG. 7A.

It may be readily understood from the comparison of FIGS. 5A, 6A and 7A with FIGS. 5B, 6B and 7B that the abnormality is quickly detected in the present invention making it possible to quickly attend to the necessary recovery process and the like.

Further, the present invention is not limited to these embodiments, but various variations and modifications may be made without departing from the scope of the present invention.

What is claimed is:

1. A direct memory access controller to control a direct memory access in a plurality of channels of a data processing apparatus which includes at least a system bus, and a) a central processing unit, b) an input/output interface and c) a memory, which are coupled to said system bus, said plurality of channels having predetermined priority sequences, said direct memory access controller comprising:

bus and terminal controller means coupled to the system bus of said data processing apparatus for obtaining a right to use the system bus responsive to a transfer request;

interrupt and slave controller means coupled to the system bus for controlling an interrupt which is made to the central processing unit when a data transfer ends for each of said plurality of channels and for controlling an access from the central processing unit; and operation determination means for determining an operation of the direct memory access controller depending on the transfer request, whether or not said bus and terminal controller means obtained the right to use the system bus and whether or not the access is made from the central processing unit, said slave and interrupt controller means including an interrupt controller for supplying to the central processing unit an interrupt of a channel, during an interrupt acknowledge cycle, in which an abnormal end of a data transfer has occurred with a priority over other channels, in which a normal end of a data transfer has occurred, regardless of the priority sequences of said plurality of channels.

2. The direct memory access controller as claimed in claim 1 wherein said interrupt controller supplies to the central processing unit interrupts of channels in which an abnormal end of a data transfer has occurred in a sequence dependent on the priority sequence of said plurality of channels and with a priority over other channels in which a normal end of a data transfer has occurred regardless of the priority sequences of said plurality of channels.

3. The direct memory access controller as claimed in claim 1 wherein said interrupt controller comprises an interrupt channel determination circuit for assigning priorities to channels in which an abnormal end has occurred over channels in which a normal end has occurred when the data transfers in said plurality of channels end approximately at the same time and for determining a single selected channel in which an interrupt is made depending on the predetermined priority sequences of said plurality of channels, a vector register for storing a normal interrupt vector which corresponds to a normal end and an abnormal interrupt vector which corresponds to an abnormal end for each of said plurality of channels, and a read-out control circuit for reading out the interrupt vector from said vector register for the selected channel determined in said interrupt channel determination circuit and for supplying the read interrupt vector to the central processing unit as the interrupt of the selected channel.

4. The direct memory access controller as claimed in claim 3 wherein said interrupt channel determination circuit includes a programmable logic array.

5. The direct memory access controller as claimed in claim 3 which further comprises a central processor for controlling said interrupt and slave controller means and said operation determination means, said interrupt controller further comprises a status register for storing end status from the central processor for each of said plurality of channels, an interrupt mask register for storing an interrupt mask from the central processing unit for each of said plurality of channels, and an interrupt mask and interrupt discriminating circuit for discriminating whether an end of the data transfer is said normal end or said abnormal end based on the end status and the interrupt mask respectively outputted from said status register and said interrupt mask register, said interrupt channel determination circuit assigning priorities to the channels based on an output signal of said interrupt mask and interrupt discriminating circuit.

6. The direct memory access controller as claimed in claim 5 wherein said interrupt controller further comprises a decoder for decoding an address from the central processor, said status register storing the end status responsive to an output signal of said decoder when a predetermined address is decoded in said decoder.

7. The direct memory access controller as claimed in claim 5 wherein said interrupt controller further comprises a decoder for decoding an address from the central processing unit, said interrupt mask register storing the interrupt mask responsive to an output signal of said decoder when a predetermined address is decoded in said decoder.

8. The direct memory access controller as claimed in claim 5 wherein said interrupt controller further comprises a decoder for decoding an address from the central processing unit, said vector register storing the interrupt vector responsive to an output signal of said decoder when a predetermined address is decoded in said decoder.

9. A direct memory access controller to control a direct memory access in a plurality of channels of a data processing apparatus which includes at least two system buses which operate mutually independent of each other and a) a central processing unit, b) an input/output interface and c) a memory, which are coupled to each of the system buses, said plurality of channels having predetermined priority sequences, said direct memory access controller comprising:

bus and terminal controller means coupled to the at least two system buses of said data processing apparatus for obtaining a right to use the system buses responsive to a transfer request;

interrupt and slave controller means coupled to the system buses for controlling an interrupt which is made to the central processing unit when a data transfer ends for each of said plurality of channels and for controlling an access from the central processing unit; and operation determination means for determining an operation of the direct memory access controller depending on the transfer request, whether or not said bus and terminal controller means obtained the right to use the system buses and whether or not the access is made from the central processing unit, said slave and interrupt controller means including an interrupt controller for supplying to the central processing unit an interrupt of a channel, during an interrupt acknowledge cycle, in which an abnormal end of a data transfer has occurred with a priority over other channels, in which a normal end of a data transfer has occurred, regardless of the priority sequences of said plurality of channels.

10. The direct memory access controller as claimed in claim 9 wherein said interrupt controller supplies to the central processing unit interrupts of channels in which said abnormal end of a data transfer has occurred in a sequence dependent on the priority sequence of said plurality of channels and with a priority over other channels in which said normal end of a data transfer has occurred regardless of the priority sequences of said plurality of channels.

11. The direct memory access controller as claimed in claim 9 wherein said interrupt controller comprises an interrupt channel determination circuit for assigning priorities to channels in which said abnormal has occurred over channels in which said normal end has occurred when the data transfers in said plurality of channels end approximately at the same time and for determining a single selected channel in which an interrupt is made depending on the predetermined priority sequences of said plurality of channels, a vector register for storing a normal interrupt vector which corresponds to said normal end and an abnormal interrupt vector which corresponds to said abnormal end for each of said plurality of channels, and a read-out control circuit for reading out the interrupt vector from said vector register for the selected channel determined in said interrupt channel determination circuit and for supplying the read interrupt vector to the central processing unit as the interrupt of the selected channel.

12. The direct memory access controller as claimed in claim 11 wherein said read-out control circuit reads out both the normal and abnormal interrupt vectors.

13. The direct memory access controller as claimed in claim 11 wherein said interrupt channel determination circuit includes a programmable logic array.

14. The direct memory access controller as claimed in claim 11 which further comprises a central processor for controlling said interrupt and slave controller means and said operation determination means, said interrupt controller further comprises a status register for storing end status from the central processor for each of said plurality of channels, an interrupt mask register for storing an interrupt mask from the central processing unit for each of said plurality of channels, and an interrupt mask and interrupt discriminating circuit for discriminating whether an end of the data transfer is said normal end or said abnormal end based on the end status and the interrupt mask respectively output from said status register and said interrupt mask register, said interrupt channel determination circuit assigning priorities to the channels based on an output signal of said interrupt mask and interrupt discriminating circuit.

15. The direct memory access controller as claimed in claim 14 wherein said interrupt controller further comprises a decoder for decoding an address from the central processor, said status register storing the end status responsive to an output signal of said decoder when a predetermined address is decoded in said decoder.

16. The direct memory access controller as claimed in claim 14 wherein said interrupt controller further comprises a decoder for decoding an address from the central processing unit, said interrupt mask register storing the interrupt mask responsive to an output signal of said decoder when a predetermined address is decoded in said decoder.

17. The direct memory access controller as claimed in claim 14 wherein said interrupt controller further comprises a decoder for decoding an address from the central processing unit, said vector register storing the interrupt vector responsive to an output signal of said decoder when a predetermined address is decoded in said decoder.

* * * * *